(12) United States Patent
Okello et al.

(10) Patent No.: US 8,150,326 B2
(45) Date of Patent: Apr. 3, 2012

(54) SIGNAL PROCESSING FOR MULTI-SECTORED WIRELESS COMMUNICATIONS SYSTEM AND METHOD THEREOF

(75) Inventors: James Awuor Oduor Okello, Tokyo (JP); Katsutoshi Seki, Tokyo (JP)

(73) Assignee: NEC Corporation, Tokyo (JP)

( * ) Notice: Subject to any disclaimer, the term of this patent is extended or adjusted under 35 U.S.C. 154(b) by 2 days.

(21) Appl. No.: 12/516,587

(22) PCT Filed: Dec. 28, 2007

(86) PCT No.: PCT/JP2007/075423
§ 371 (c)(1),
(2), (4) Date: May 28, 2009

(87) PCT Pub. No.: WO2009/084121
PCT Pub. Date: Jul. 9, 2009

(65) Prior Publication Data
US 2011/0059713 A1 Mar. 10, 2011

(51) Int. Cl.
*H04B 1/00* (2006.01)
*H04B 15/00* (2006.01)
(52) U.S. Cl. .................... 455/63.1; 455/67.13
(58) Field of Classification Search .............. 455/561, 455/501, 502, 504, 506, 63.1, 65, 66.1, 67.11, 455/67.13
See application file for complete search history.

(56) References Cited

U.S. PATENT DOCUMENTS

| | | |
|---|---|---|
| 5,596,333 A | 1/1997 | Bruckert |
| 5,625,876 A | 4/1997 | Gilhousen et al. |
| 5,933,787 A | 8/1999 | Gilhousen et al. |
| 2006/0291371 A1* | 12/2006 | Sutivong et al. ............. 370/208 |
| 2009/0069022 A1* | 3/2009 | Manakkal et al. ............ 455/450 |

FOREIGN PATENT DOCUMENTS
WO 2006133631 A1 12/2006

OTHER PUBLICATIONS
International Search Report for PCT/JP2007/075423 mailed Oct. 16, 2008.
(Continued)

*Primary Examiner* — Ping Hsieh

(57) ABSTRACT

Disclosed is a signal processing system in a base station that receives and processes single carrier or multiple carrier signals from transmitting units in a sectored coverage area with at least one transmit antenna and at least one receive antenna, the signal power gain between transmit and receive antennas within each sector being represented as a channel matrix with path gains. The system comprises: a detection unit that determines if signals from a given target transmitting unit is available in the signal received in a sector, and generates a detect signal for a combination unit; a decision unit that selects size of interference cancellation matrix; and an interference cancellation unit. When the signal from detection unit indicates that signal from a target transmitting unit is in the signal associated with at least two sectors, the decision unit joins channel matrices associated with the sectors to generate a large channel matrix, and using the resulting large channel matrix, the interference cancellation unit eliminates interference or generates originally transmitted signal. When the signal from detection unit indicates that signal from a target transmitting unit is in the signal of only one sector, the interference cancellation unit eliminates interference from the received signal, using the channel matrix associated with the one sector.

18 Claims, 14 Drawing Sheets

OTHER PUBLICATIONS

C.U. Saraydar et al., "Capacity Enhancement for CDMA Systems Through Adaptive Cell Sectorization", IEEE Wireless Communications and Networking Conference, vol. 3, pp. 1139-1143, Sep. 1999.

N. Maeda et al., "Throughput Comparison between VSF-OFCDM and OFDM Considering Effect of Sectorization in Forward Link Broadband Packet Wireless Access", IEEE VTC, vol. 1, pp. 47-51, Sep. 2002.

V. K. N. Lau et al., Channel Adaptive Technologies and Cross-Layer Designs for Wireless Systems with Multiple Antennas, Wiley-Interscience, A John Wiley & Sons, Inc., 2006, p. 134-137, 162-165.

L. Hanzo et al., "OFDM and MC-CDMA fro Broadband Multi-User Communications, WLANs and Broadcasting", IEEE Press, Wiley, 2003, p. 38-41.

A. F. Molisch, "Wireless Communications", IEEE Press, John Wiley & Sons. LTD, 2005, p. 248-255.

S. Sanayei, et al., "Antenna Selection in MIMO Systems", IEEE Communications Magazine, Oct. 2004. pp. 68-73.

J. Wang et al., "Pilot-Symbol Aided Channel Estimation in Spatially Correlated Multiuser Channels", IEEE VTC, vol. 1, pp. 33-37, Sep. 2004.

J. G. Proakis, "Digital Communications Fourth Edition", McGraw Hill, 2001, p. 720-721.

\* cited by examiner

SIGNAL PROCESSING FOR MULTI-SECTORED WIRELESS COMMUNICATIONS SYSTEM AND METHOD THEREOF

This application is the National Phase of PCT/JP2007/075423, filed Dec. 28, 2007.

FIELD OF THE INVENTION

The present invention relates to a wireless communications system and method.

BACKGROUND OF THE INVENTION

Sectorization is a technique that has been used in mobile communications systems in order to minimize multiple access interference (MAI) and hence increase system capacity on each base station [Non-patent Documents 1, 2]. In this technique, a cell of a base station (BS) is divided into a plurality of sectors, and spatially separated mobile units in different sectors can use different channels or share the same channel. Here, the term channel refers to time, frequency, spreading code, interleaving pattern or any other definition as known in communications systems. Furthermore, each sector is serviced by one or more transmit and receive antennas. When adjacent sectors share the same channel, there arises a significant increase in interference among mobile units in the adjacent sectors. This kind of interference is detrimental to wireless communication, and as result, throughput of data transmission between the base station and mobile units will be reduced.

In one of the related art [Patent Document 1], the base station determines an approximate location of a communication unit by comparing uplink signal received from each sector. Comparison is performed on the signal strength of the received uplink signals, although the comparison can be performed using other signal quality metrics such as BER (Bit Error Rate), Word Error Rate, CIR (Committed Information Rate), noise ratio. GPS (Global Positioning System) can also be used. This information can then be used to direct a narrower beam to a target mobile unit, and as result reducing interference. However, in uplink transmission, effect of multiple paths of transmission due to natural terrain will cause the uplink signal to be detected in signals received from multiple sectors. Furthermore, a spatially separated mobile unit may transmit a signal such that part of transmitted signal arrives at a base station in a direction that is very close to a target mobile unit.

FIG. 1 illustrates such a scenario, wherein signals from transmitting unit-1, (TU1) are transmitted to base station (BS) through paths P1 and P2, wherein path (P2) involves a reflection at point B. Similarly, signal from transmitting unit-2, (TU2) is transmitted to the base station (BS) through paths P3.

As can be seen in FIG. 1, at the base station (BS), the direction of arrival of signal along P2 is almost the same as the signal along P3. In this situation, a very narrow beam may have to be created or the signal from this direction will be ignored completely. In practice, very narrow beams can only be created by using a large number of receiving antennas. Creating of such narrow beams ignores part of the transmitted signal that arrives in overlapping directions with interfering signals, hence reducing the power of received signal and as result affecting the throughput of communication.

In another related art, signals from each sector are processed separately [Patent Document 2]. The processing involves demodulation and interference cancellation. Thereafter, the processed signals from the sectors are combined using Maximal Ratio Combining (MRC) [Non-patent Document 5]. Alternative methods of combining or selection can also be deduced from reference [Non-patent Document 6].

FIG. 2 illustrates such kind of a system. By combining signals received from different sectors to generate target signal, overall signal to noise ratio is increased, hence increasing the throughput of a communications system. In addition, this technique of signal processing offers a reduced computational load in comparison to the method of creating beams that are much narrower than the size of a sector.

In multiple receive and transmit antenna system, interference cancellation, which is otherwise known as equalization can be done using different kind of algorithms [Non-patent Document 3].

As an example, in a typical Orthogonal Frequency Division Multiplexing (OFDM) based receiver [Non-patent Document 4], each subcarrier associated with each receive antenna of a given sector can be considered as a channel matrix H, resulting in a signal (vector) $s_k$ that is given by $$s_k = H_{k,i} x_k + n_{k,i} \quad (1)$$

where k is a subcarrier index that can take an integer value that is less than total number of available subcarriers, i is an index of a sector, $H_{k,i}$ is a channel matrix at subcarrier k and sector with index i, $x_k$ is originally transmitted signal vector at subcarrier k and $n_{k,i}$ is a noise vector.

If we consider that Minimum Mean Square Error (MMSE) algorithm has been used to remove interference from received signal vector $s_k$ then the signal detected to have originated from the ith sector is given by (2)

$$x_{k,i} = (\sigma^2 I + H_{k,i}{}^H H_{k,i})^{-1} H_{k,i}{}^H s_k \quad (2)$$

In this expression, it has been assumed that channel matrix $H_{k,i}$ of ith sector at the kth subcarrier has been estimated by a channel estimation unit. There are several techniques by which this channel matrix $H_{k,i}$ can be estimated to an accurate level [Non-patent Document 8] [Patent Document 4]. Having detected the original transmitted signal from a given transmitting unit, the next step is to combine all the signals that have been detected at different sectors. One way of doing this, is to utilize an optimum combination algorithm such as MRC [Non-patent Document 5].

FIG. 2 illustrates a general case in a signal flow diagram where symbols detected separately are combined to create symbols for channel decoding, taking into consideration sector selection as described in [Patent Document 1]. The received signals at different sectors undergo preprocessing 11 and demodulation 12, respectively, and are combined by symbol combination 13 to generate a detected signal.

FIG. 3 is a block diagram showing the configuration of the system shown in FIG. 2. Referring to FIG. 3, two signal streams (25) and (26) are associated with sector-1. In addition, channel parameters (29) are used together with the two streams (Sector-1, signal x0, x1) (25) and (26) to perform interference cancellation in unit (21-1). Similarly, two signal streams (Sector-2, signal y0, y1) (27) and (28) that are associated with sector-2, are used together with channel parameters (30) to perform interference cancellation in unit (21-2). The resulting signals that have been generated from each sector and have interference cancelled are combined in combination unit (13). In practice, a detection unit (35) is also provided to generate information that is used to perform handover from one sector to another. Such kind of a handover is implemented using a selector (34) that select a signal among a combined signal (33), a signal from sector-1 (31) and a signal from sector-2 (32).

Detecting the location of a transmitting unit using the methods [Patent Document 1] mentioned earlier has its own disadvantage. Method based on signal to noise ratio involves generating a reference symbol and channel matrix, and this is computationally involving since it involves creating a kind of replica. Method based on BER involves independently decoding signals detected from each sector.

In all the above-mentioned related arts, the base station does not dynamically utilize efficiently all information that is received from signal associated with each sector. In addition, there is a necessity to implement a simple algorithm for detecting if signal from a target-transmitting unit is available within the received signal associated with a given sector.

[Non-Patent Document 1]
C. U. Saraydar and A. Yener, "Capacity Enhancement for CDMA Systems Through Adaptive Cell Sectorization," IEEE Wireless Communications and Networking Conference, vol. 3, pp. 139-1143, September, 1999.

[Non-Patent Document 2]
N. Maeda, et al., "Throughput Comparison between VSF-OFCDM and OFDM Considering Effect of Sectorization in Forward Link Broadband Packet Wireless Access," IEEE VTC, vol. 1, pp. 47-51, September, 2002.

[Non-Patent Document 3]
V. K. Lau, Channel Adaptive Technologies and Cross Layer Designs for Wireless Systems with Multiple Antennas, Wiley 2006.

[Non-Patent Document 4]
L. Hanzo, OFDM and MC-CDMA, IEEE Press, Wiley, 2003.

[Non-Patent Document 5]
A. F. Molisch, Wireless Communications, IEEE Press, Wiley, 2005.

[Non-Patent Document 6]
S. Sanayei, et al., "Antenna Selection in MIMO Systems," IEEE Communications Magazine, October 2004.

[Non-Patent Document 7]
J. Wang and K. Araki, "Pilot-Symbol Aided Channel Estimation in Spatially Correlated Multiuser Channels," IEEE VTC, vol. 1, pp. 33-37, September, 2004.

[Non-Patent Document 8]
J. G. Proakis, Digital Communications, 4th Edition, McGraw Hill.

[Patent Document 1]
U.S. Pat. No. 5,596,333
[Patent Document 2]
U.S. Pat. No. 5,625,876
[Patent Document 3]
U.S. Pat. No. 5,933,787

SUMMARY

The entire disclosure of Patent Documents 1-3 and Non-patent Documents 1-8 are incorporated herein by reference thereto. The below is the result of the analysis by the present inventors.

Dynamical utilization of all information that is within the signals received from multiple sectors in a multi-sectored wireless base communication station is demanded.

In addition, implementation of a simple algorithm for detecting the presence of target signal in the signals received from multiple sectors is demanded.

Accordingly, it is an object of the present invention to provide an apparatus and a method that realize dynamically processing signals received from multiple sectors to increase throughput of uplink communications in a multi-sectored wireless base station.

The invention disclosed in this application is generally configured as follows.

According to one aspect of the present invention, there is provided a signal processing method in a base station receiver that receives and processes single carrier or multiple carrier signals from a plurality of transmitting units in a sectored coverage area, signal power gain between transmit and receive antennas of the transmitting units and the receiver within each sector being represented as a channel matrix with path gains, the method comprising:

combining a plurality of the channel matrices associated with respective sectors to generate a channel matrix which is larger in size than each of the channel matrices associated with respective sectors, and concatenating a plurality of received signal vectors associated with respective sectors to generate a received signal vector which is larger in size than each of the received signal vectors associated with respective sectors; and canceling interference from one or more other transmitting units sharing a given channel with a target transmitting unit, using the generated channel matrix and the generated received signal vector.

According to another aspect of the present invention, there is provided a signal processing method in a base station receiver that receives and processes single carrier or multiple carrier signals from a plurality of transmitting units in a sectored coverage area, signal power gain between transmit and receive antennas of the transmitting units and the receiver within each sector being represented as a channel matrix with path gains, the method comprising:

determining if signal from a given target transmitting unit is available in the received signal of a sector;

in case signal from the target transmitting unit is detected in at least two sectors, combining a plurality of the channel matrices associated with respective sectors to generate a channel matrix which is larger in size than each of the channel matrices associated with respective sectors, and concatenating a plurality of received signal vectors associated with respective sectors to generate a received signal vector which is larger in size than each of the received signal vectors associated with respective sectors; and canceling interference from one or more other transmitting units sharing a given channel with the target transmitting unit, using the generated channel matrix and the generated received signal vector;

while in case signal from the target transmitting unit is detected in only one sector, canceling interference from the received signal from the transmitting unit, using the channel matrix and the received signal vector each associated with the one sector.

In the present invention, the step of determining if signals from the target transmitting unit is available in the received signal of a sector comprises:

evaluating the path gain at subcarriers using a pilot signal specific to the target transmitting unit; converting the estimated path gain of the subcarriers to a time domain impulse response (h0,h1, . . . , hN);

separating the time domain impulse response into a first part (true impulse response): (h0,h1 . . . , hL) and a second part (false impulse response): (hL+1, . . . , hM), wherein the first part corresponds to delay profile of a channel with a length corresponding to the delay spread;

evaluating the mean square value of the first part (h0, h1 ..., hL) to obtain a first parameter (PCH);

evaluating the mean square value of the second part (hL+1, ..., hM) to obtain a second parameter (PNCH);

subtracting the second parameter (PNCH) from the first parameter (PCH) to obtain a third parameter (DNCH);

dividing the first parameter (PCH) with the third parameter (DNCH) to obtain a fourth parameter (RNCH); and comparing the fourth parameter (RNCH) with a predetermined threshold, wherein if the comparison result indicates that the fourth parameter is greater than the threshold, it is determined that signal from the transmitting unit is in the signal received from a given sector.

In the present invention, the second part (false time domain impulse response) of the time domain impulse response is obtained by ignoring part of the impulse response that correspond to the channel delay profile, and impulse response that arise from interfering mobile terminal.

In the present invention, the step of determining if signals from a given target transmitting unit is available in the received signal of a sector, comprises:

evaluating the path gain at the subcarriers of at least two different time slots, using a pilot signal that is specific to a given transmitting unit;

converting the estimated path gain of the subcarriers for each of the time slots to obtain an equivalent time domain channel impulse response;

for at least two of time slots, separating each of the time domain impulse responses into a first part: (h0,h1 ..., hL) and a second part: (hL+1, ..., hN), wherein the first part (h0,h1 ..., hL) has a length that corresponds to the delay spread of transmission channel;

evaluating a correlation parameter that has a correlation factor of at least the first part (h0,h1 ..., hL) of the first time slot and the first part (g0, g1 ..., gL) of any other time slot other than the first time slot; and modifying the correlation parameter by additional signal processing to obtain a reference for comparison with a predetermined threshold, wherein if the reference parameter is greater than the threshold, it is determined that signal from the transmitting unit is in the signal received from a given sector.

In the present invention, correlation factor is an average of correlation between true impulse responses (first parts of the channel impulse response) at two or more time slots.

In the present invention, the step of determining if signals from a given target transmitting unit is available in the received signal of a sector, comprises:

evaluating the path gain at the subcarriers of at least one or more time slots using a pilot signal that is specific to a given mobile unit;

evaluating a parameter that is a measure of how the path gains at different subcarriers within the same time slot, are correlated to one another; and modifying the parameter by additional signal processing that includes either averaging or filtering to obtain a correlation parameter of a given transmitting unit and a given sector.

In the present invention, correlation parameter is modified by:

evaluating power of the first part (h0,h1 ..., hL) of the channel impulse response at one or more time slots to obtain a normalization parameter; and dividing normalization parameter with the correlation parameter to obtain a modified correlation parameter.

In the present invention, interference cancellation is performed using mean square error approach.

Alternatively, in the present invention, interference cancellation is performed using zero forcing approach.

Alternatively, in the present invention, interference cancellation is performed using maximum likelihood detection approach.

According to another aspect of the present invention, there is provided a signal processing system in a base station receiver that receives and processes single carrier or multiple carrier signals from a plurality of transmitting units in a sectored coverage area, signal power gain between transmit and receive antennas of the transmitting units and the receiver within each sector being represented as a channel matrix with path gains, the system comprising:

a channel matrix generation unit that combines a plurality of the channel matrices associated with respective sectors to generate a channel matrix which is larger than the channel matrices associated with respective sectors, and concatenates a plurality of received signal vectors associated with respective sectors to generate a received signal vector which is larger than the received signal vectors associated with respective sectors; and an interface cancellation unit that using the generated channel matrix and the generated received signal vector, cancels interference from other transmitting unit sharing a given channel with a target transmitting unit.

According to another aspect of the present invention, there is provided a signal processing system in a base station receiver that receives and processes single carrier or multiple carrier signals from a plurality of transmitting units in a sectored coverage area; signal power gain between transmit and receive antennas of the transmitting units and the receiver within each sector being represented as a channel matrix with path gains, the system comprising:

a decision unit that determines if signal from a given target transmitting unit is available in the received signal of a sector;

a channel matrix generation unit that combines a plurality of the channel matrices associated with respective sectors to generate a channel matrix which is larger than the channel matrices associated with respective sectors, and concatenates a plurality of received signal vectors associated with respective sectors to generate a received signal vector which is larger than the received signal vectors associated with respective sectors; and an interface cancellation unit that, if signal from the target transmitting unit is detected in at least two sectors, cancels interference from one or more other transmitting units sharing a given channel with the target transmitting unit, using the generated channel matrix and the generated received signal vector;

the interface cancellation unit canceling interference from the received signal from the transmitting unit, using the channel matrix and the received signal vector each associated with the one sector, if signal from the target transmitting unit is detected in only one sector.

In the present invention, the detection unit may comprise:

a channel estimation unit that evaluates frequency-domain path gain at subcarriers using pilot signal that is specific to a given mobile unit;

a time domain conversion unit that converts the estimated frequency domain path gain of the subcarriers to a time domain impulse response (h0,h1 ..., hN);

a separation unit that separates the time domain impulse response into two parts, true impulse response: (h0,h1 ..., hL) and false impulse response: (hL+1, ..., hM), where the true impulse response corresponds to delay spread of a channel;

a first mean gain evaluating unit that evaluates the mean square value of the first part (h0,h1 ..., hL) to obtain a first parameter (PCH);

a second mean gain evaluating unit that evaluates the mean square value of the second part (hL+1, ..., hM) to obtain a second parameter (PNCH);

a subtraction unit that subtracts the second parameter (PNCH) from the first parameter (PCH) to obtain a third parameter (DNCH);

a division unit that divides the first parameter (PCH) with the third parameter (DNCH) to obtain a fourth parameter (RNCH); and a comparison unit that compares the fourth parameter (RNCH) with a predetermined threshold, if the comparison result indicates that the fourth parameter is greater than the threshold, deciding that signal from the mobile unit is the to be in the signal received from a given sector.

In the present invention, the separation unit generates a second part of the time domain impulse response that is obtained by ignoring part of the impulse response that correspond to the channel delay profile, and impulse response that arise from any interfering mobile unit.

In the present invention, the detection unit comprises:

a channel estimation unit that evaluates the frequency-domain path gain at subcarriers of at least two different time slots using a pilot signal that is specific to a given mobile unit;

a time domain conversion unit that converts the estimated frequency-domain path gain of the subcarriers for each of the time slots to obtain an equivalent time domain channel impulse response;

a separation unit that separates the time domain of at least two of the time slots into two parts, where the two parts of each of the time slots, the first part has a length that corresponds to the delay spread of transmission channel;

a correlation unit that evaluates a correlation between at least the first part (h0,h1 ..., hL) of the first time slot and the first part (g0,g1 ..., gL) of any other time slot other than the first time slot; and a correlation manipulation unit that modifies the correlation parameter evaluated by the correlation unit, by additional signal processing to obtain a reference for comparison with a predetermined threshold in the comparison unit.

In the present invention, the correlation unit evaluates correlation by averaging of correlation between first part of the channel impulse response of a combination of two time slots.

In the present invention, in determining if signals from a given target transmitting unit is available in the received signal of a sector, the detection unit evaluates the path gain at the subcarriers of at one or more time slots using a pilot signal that is specific to a given mobile unit;

evaluates a parameter that is a measure of how path gains at different subcarriers and same time slot, are correlated to one another; and modifies the parameter by additional signal processing that includes either averaging or filtering to obtain a correlation parameter of a given transmitting unit and a given sector.

In the present invention, correlation parameter is modified by:

evaluating cross correlation of the first part (h0,h1 ..., hL) of the channel impulse response at least one of time slot to obtain a normalization parameter; and dividing normalization parameter with the correlation parameter to obtain a modified correlation parameter.

In the present invention, interference cancellation is performed using mean square error approach.

In the present invention, interference cancellation is performed using zero forcing approach.

In the present invention, interference cancellation is performed using maximum likelihood detection approach.

There is provided a base station comprising the signal processing system according to the present invention.

The meritorious effects of the present invention are summarized as follows.

According to the present invention, improvement in channel capacity can be realized by reducing the BER when a target signal is detected in more than one sector.

Further, according to the present invention, by dynamically changing the size of the channel matrix, overall computation complexity of the receiver is reduced since an increased size of channel matrix is used only when it is possible to increase the channel capacity.

Still other features and advantages of the present invention will become readily apparent to those skilled in this art from the following detailed description in conjunction with the accompanying drawings wherein examples of the invention are shown and described, simply by way of illustration of the mode contemplated of carrying out this invention. As will be realized, the invention is capable of other and different examples, and its several details are capable of modifications in various obvious respects, all without departing from the invention. Accordingly, the drawing and description are to be regarded as illustrative in nature, and not as restrictive.

PREFERRED MODES

Figure 1:
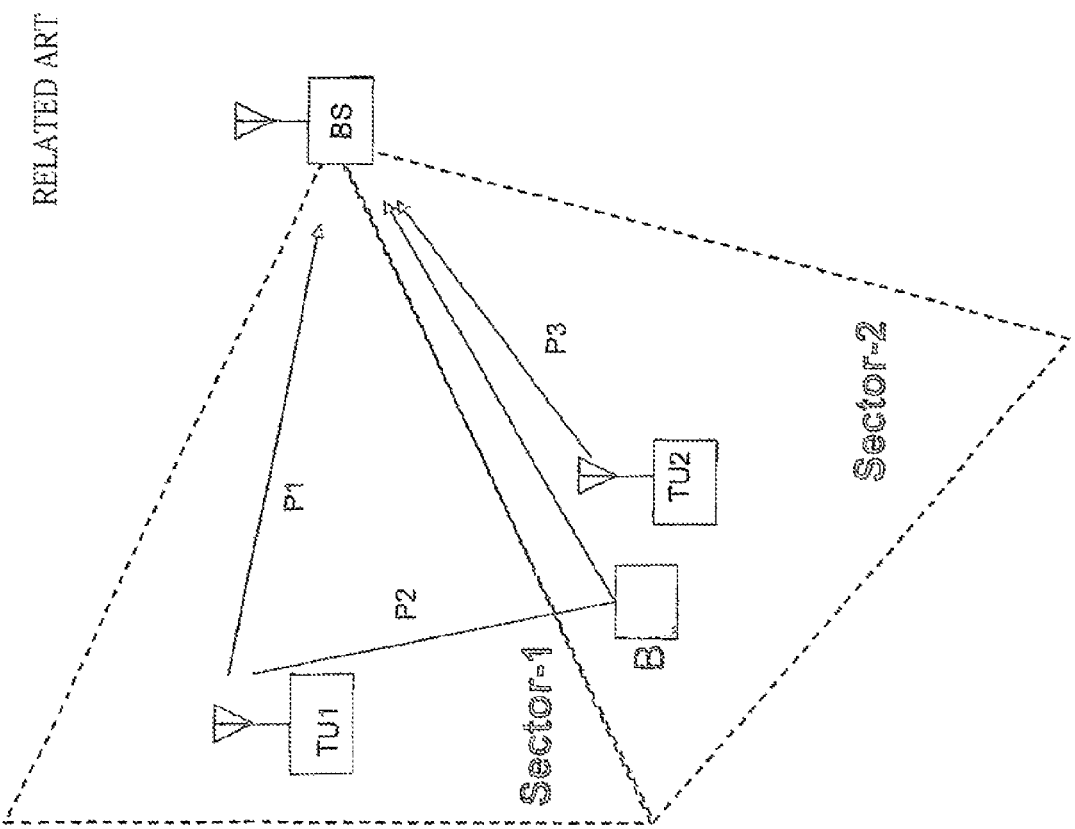
FIG. 1 is a diagram illustrating communications system with two transmitting units (TU1 and TU2) in two sectors (sector-1 and sector-2), and one receiving base station (BS).
Figure 2:
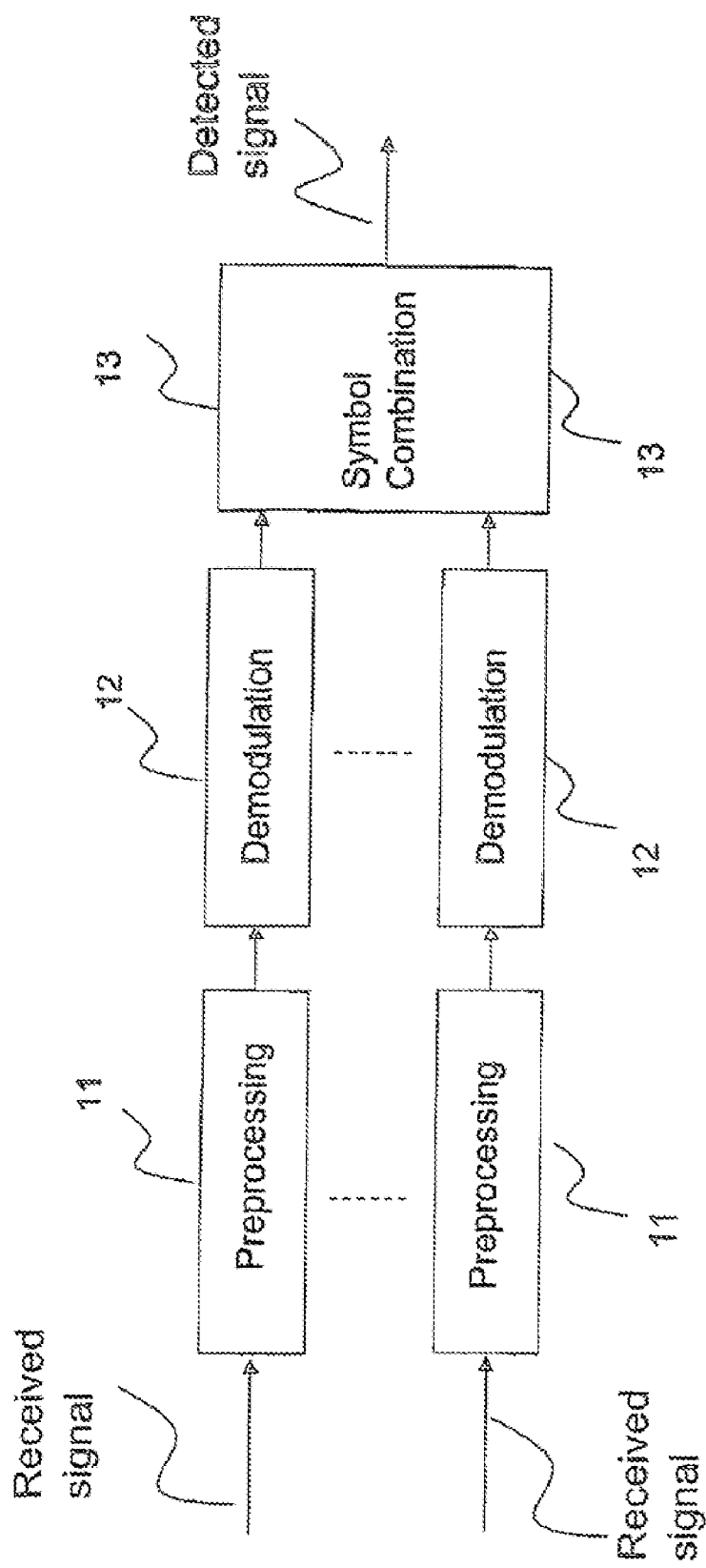
FIG. 2 is a diagram showing the configuration of a part of a generalized multi-sectored receiver of the related art.
Figure 3:
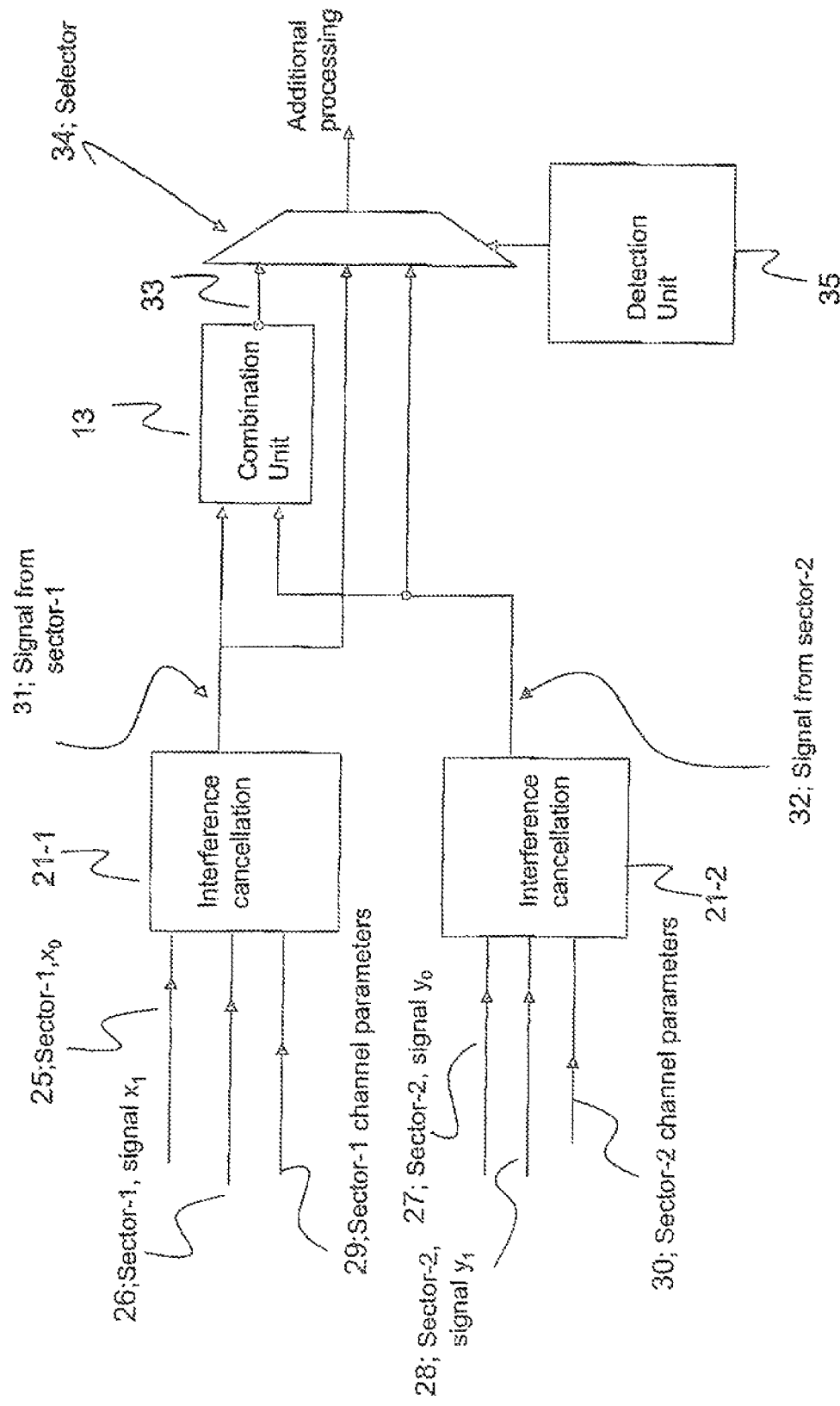
FIG. 3 is a diagram showing the configuration of a part of a MIMO receiver unit with two received signal streams per sector.
Figure 4:
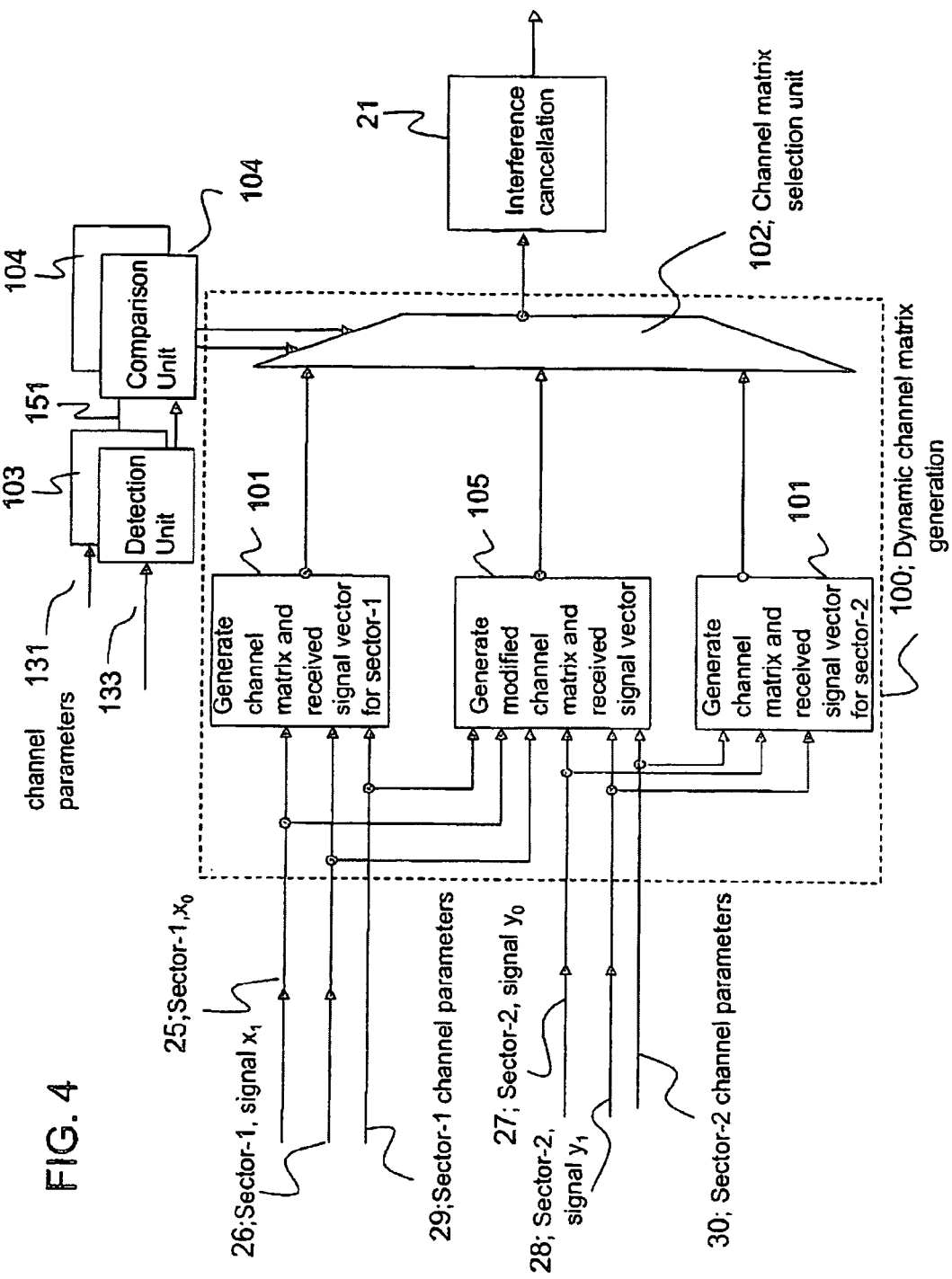
FIG. 4 is a diagram showing the configuration of the example of the present invention for signal processing with a unit for dynamic generation of channel matrix, detection unit and comparison unit.

FIG. 4 shows the configuration of an exemplary embodiment of the present invention for dynamically processing signals received from multiple sectors. The signal streams received from sector-1 (25) and (26) and signal streams received from sector-2 (27) and (28) are concatenated in a unit (105). Similarly, channel parameters (29) and (30) from sector-1 and sector-2, respectively, are used to create a modified channel matrix, dimension of which is much larger than that of each of channel matrices of respective sectors. Dynamic processing of signals received from multiple sectors is done by a detection unit (103) which receive channel parameters (131) or (133), and a comparison unit (104). Signals from a transmitting unit are detected within the signals received from two or more sectors, or the same signals are detected within the signal received from one sector. Based on the results of the comparison unit (104), a modified channel matrix and received signal vector, or channel matrix and received signal vector from one sector is selected in a channel matrix selection unit (102) and used in a unit (21) to perform interference cancellation.

Dynamic processing of signals received from multiple sectors is done by checking if signals from a transmitting unit can be detected within the signals received from two or more sectors, or if the same signals can only be detected in signal received from one sector.

The process of detection is done by a detection unit (103) that generates signal or evaluates a reference value that is used in a comparison unit (104).

There is provided one detection unit (103) for each sector.

The comparison unit (104) compares the reference signal with a preset threshold value to determine if signal received from a given sector contains signals from a target mobile unit.

Based on the decision made by the comparison unit (104), the dynamic channel matrix generation unit (100) generates the parameters for interference cancellation.

These parameters are channel matrix associated with each of the subcarriers or a frequency bands that have been utilized by a target transmitting unit to transmit its signal. There is also the received signal vector that is used with channel matrix to retrieve the desired signal.

If it is detected that signal from a transmitting unit is available in the signals received from more than one sector, then for each subcarrier or frequency band, the dynamic channel matrix generation unit (100) generates a large channel matrix that is a concatenation of the channel matrix associated with the active sectors. Here, active sectors refer to the sectors within which the signals from the target mobile unit have been detected.

Equation (3) below shows the resulting channel matrix of a single transmitting unit given that signal from a transmitting unit has been detected in the signals received from two sectors.

$$H_k^T = [H_{k,1,1} H_{k,2,1}] \quad (3)$$

where T indicates transpose of a matrix, k is a subcarrier or frequency subband index that corresponds to subcarrier of frequency sub-band that was used by a target mobile terminal, and Hk,i,u is a channel matrix of user 'u, sector with index i, at subcarrier or frequency subband k.

In this example, i takes a value of 1 or 2. Similarly, dynamic channel matrix generation unit (100) generates a signal vector that is a concatenation of the signal received from the active sectors. Using a case of two active sectors, resulting concatenated vector will be given by $$x_k = \begin{bmatrix} x_{k,1} \\ x_{k,2} \end{bmatrix} \quad (4)$$

On the other hand, if it is detected that signal from a transmitting unit is available in only one sector, the dynamic channel matrix generation unit (100) generates a channel matrix that corresponds to only this particular sector.

Figure 5:
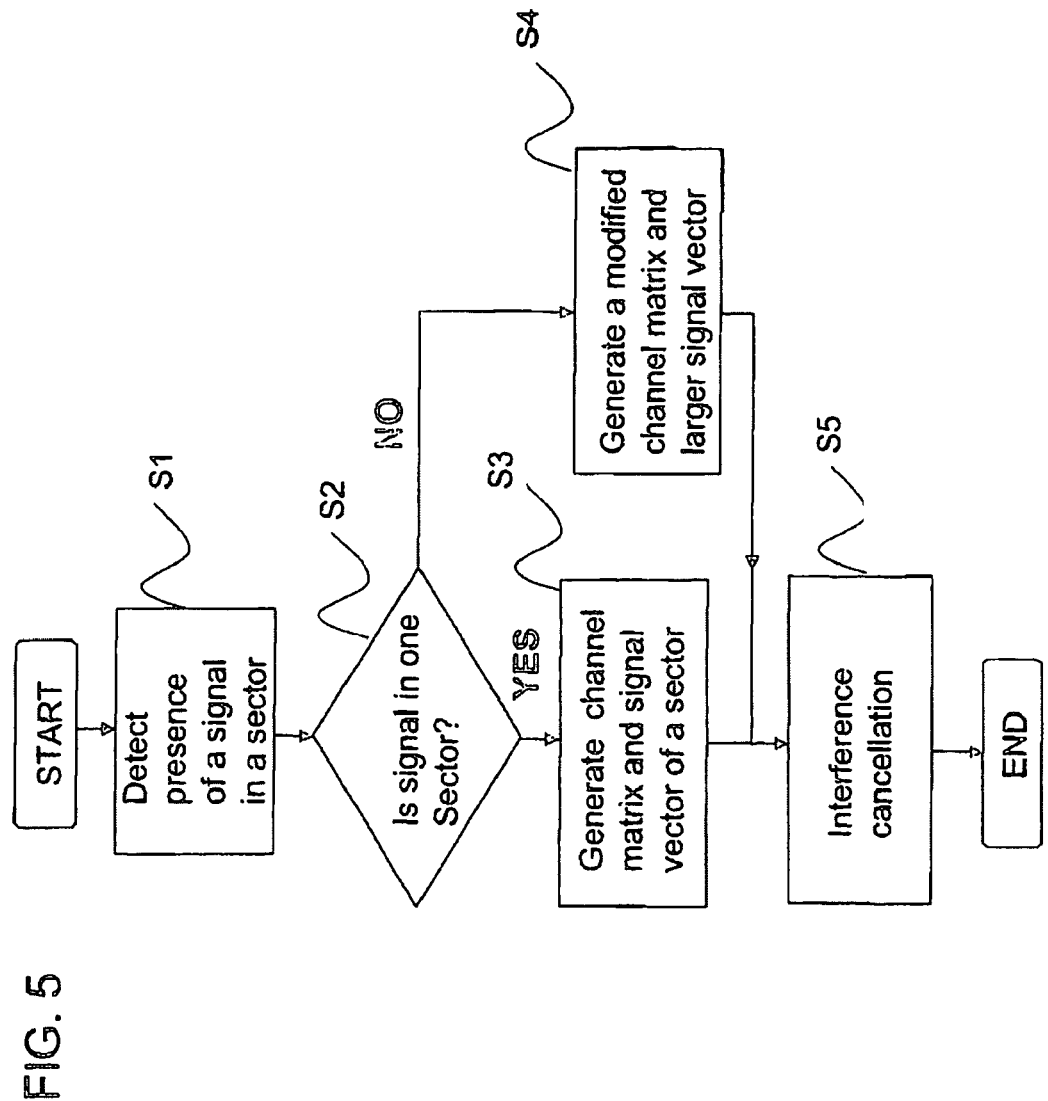
FIG. 5 is a flow chart illustrating how the size of channel matrix is dynamically changed.

FIG. 5 provides a flow chart that illustrates dynamic modification of the size of channel matrix used in interference cancellation. Processing described in steps S1, S2, S3, S4 and S5 in FIG. 5 are respectively performed by the detection units (103), the comparison and channel matrix selection unit ((104) and (102)), the unit (101), the unit (105) and the interference cancellation unit (21) in FIG. 4.

In a first step S1, it is detected if a target signal is within signal streams received in a sector.

In a second step S2, a decision is made on whether the target signal is in signal streams received in more than one sector. If the signal is in more then one sector, a fourth step is executed and if the signal is in one sector, a third step S3 is executed.

In the third step S3, channel matrix and signal vector are generated for only one sector, while in the step S4, a modified channel matrix and a larger signal vector are generated.

In a fifth step S5, the generated channel matrix and signal vector are used to perform interference cancellation.

<Detection Unit>

The detection unit (103) in FIG. 4 can be implemented using either the proposed channel gain approach or the proposed correlation based approach.

<Channel Gain-based Detection Method>

Figure 6:
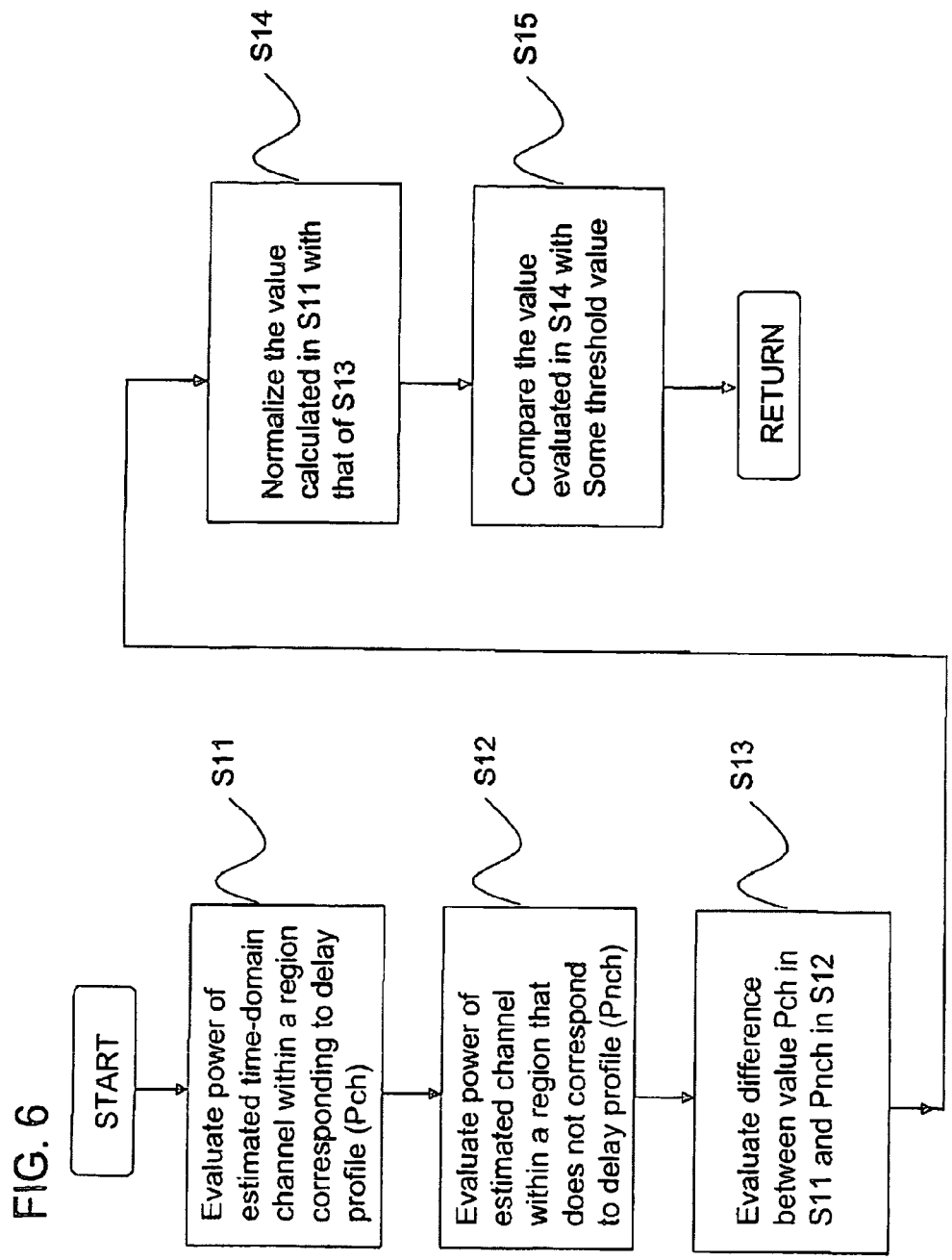
FIG. 6 is a flow chart that illustrates a method for detecting if a target signal is within the signal received from a given sector.

FIG. 6 is a flow chart that illustrates the procedure (subroutine) of the step S1 in FIG. 5 for detecting if a target signal is in the signal streams received in a sector. This method is referred to as a channel gain-based detection method.

In a step S11, the power of estimated time domain channel within a region that corresponds to a delay profile (PCH) is evaluated.

In a step S12, the power of estimated time domain channel within a region that does not correspond to a delay profile (PNCH) is evaluated.

In a step S13, PCH-PNCH, that is, the difference between the power PCH calculated in the step S11 and the power PNCH calculated in the step S12, is calculated.

In a step S14, the value PCH calculated in the step S11 is normalized with the difference value PCH-PNCH calculated in the step S13.

In a step S15, the normalized value PCH/(PCH-PNCH) calculated in the step S14 with a predetermined threshold value. If the normalized value is greater than the threshold value, for example, a target signal is detected in the signal streams received in a sector.

When two transmitting units in two different sectors share the same channel, the detection unit (103) and comparison unit (104) will detect the presence of at least one of the transmitting units. As an example if signals from only one transmitting unit can be detected in two sectors, the concatenated channel matrix will be given by $$H_k^T = \begin{bmatrix} H_{k,1,1} & H_{k,2,1} \\ 0 & H_{k,2,2} \end{bmatrix} \quad (5)$$

where 0 is a null matrix, and T indicates transpose of a matrix.

Figure 7:
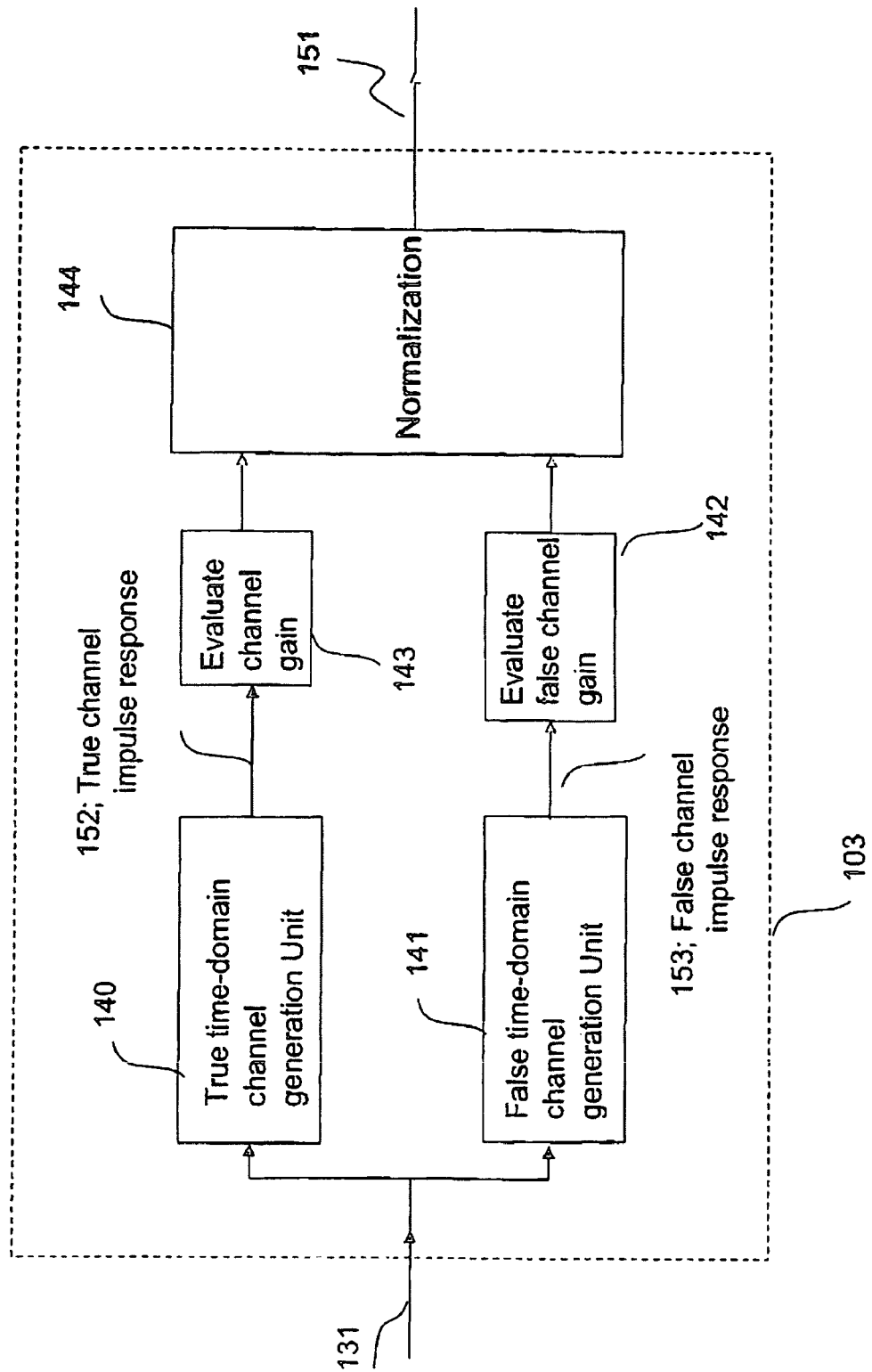
FIG. 7 is a diagram illustrating a channel gain-based direction unit.

FIG. 7 is a diagram illustrating one of the channel gain-based detection units described using a flow chart of FIG. 6. In FIG. 7, the channel parameter (131) represents time-domain channel parameters for all the possible links between transmitting and receiving antennas of a sector. In a case where each sector is serviced by two transmit antennas and two receive antennas, the time-domain channel response or parameters (131) and (133) are provided for all the possible four links of transmission between the transmitting unit and a given sector of receiving base station.

Figure 8:
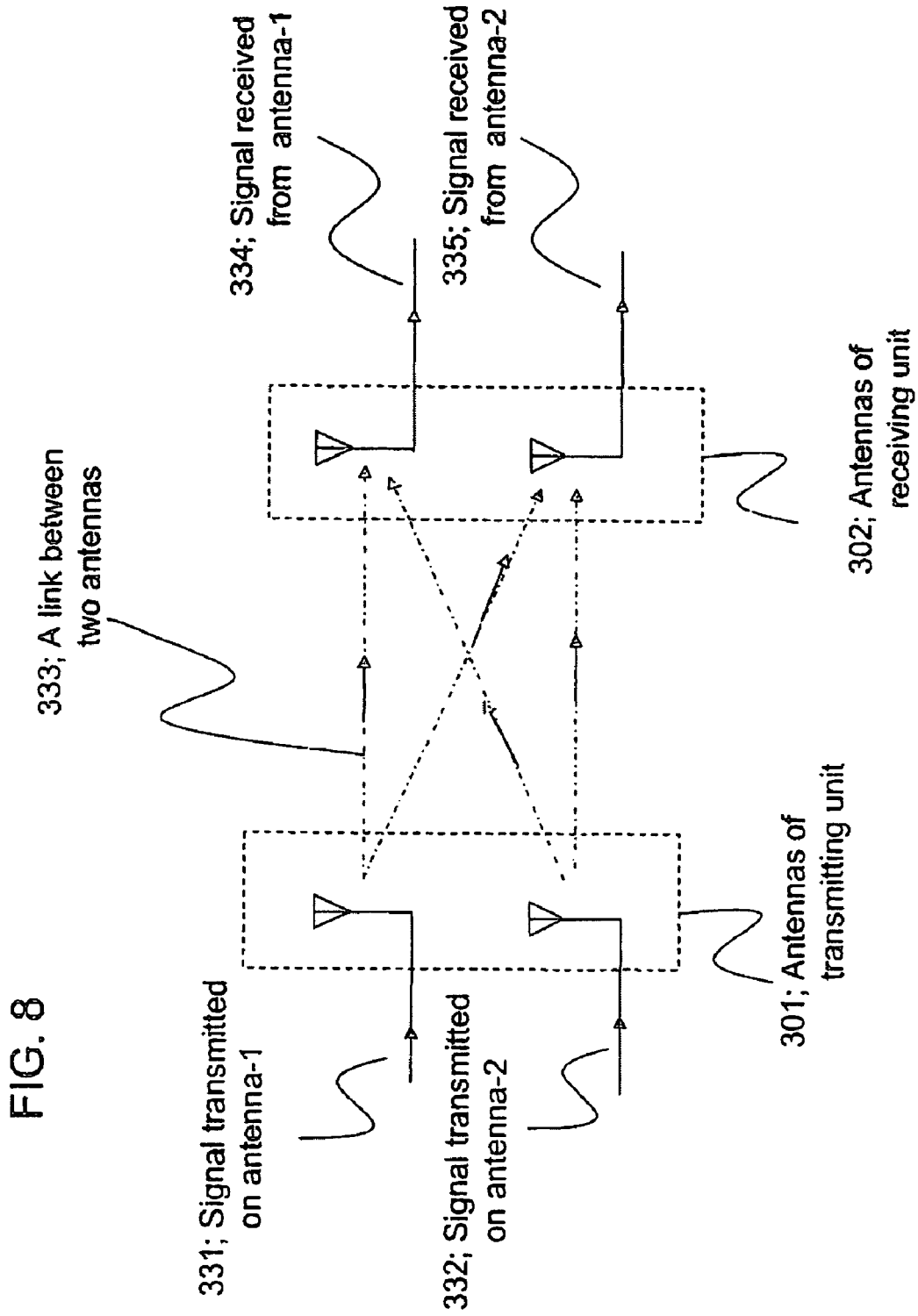
FIG. 8 is a diagram illustrating four possible wireless links between two transmitting and receiving antennas.

FIG. 8 illustrates the four possible links in a transmission system with two transmit antennas and two receive antennas. In FIG. 8, there are provided two sets of antennas (301) of a transmitting unit and two sets of antennas (302) of a receiving unit. There are links (333), each between two antennas (301 and 302) of the transmitting unit and receiving unit. In FIG. 8, reference numerals 331 and 333 designate signals transmitted on two sets of antennas (301) of the transmitting unit, respectively, and reference numerals 334 and 335 designate signals received from two sets of antennas (302) of the receiving unit, respectively.

The frequency-domain to time domain channel conversion unit converts estimated frequency-domain channel response to a time domain impulse response of the channel for all the possible four links. In one of the links, the channel impulse responses (131) or (133) is given by $$h_i \in \{h_0 h_1 \ldots h_{N-1}\} \quad (6)$$

where N is the number of impulses in the time domain channel impulse response.

Referring to FIG. 7, the channel gain-based detection unit includes: a true time-domain channel generation unit (140) that generates an actual time domain impulse response corresponding to actual delay spread [Non-patent Document 7] of the wireless channel between the transmitting unit and base station; and an evaluate channel gain unit (143) that evaluate a channel gain or mean square value, for example, of the actual time domain impulse response.

Assuming that this delay spread corresponds to Nd samples, the actual time domain impulse response will constitute of Nd samples chosen from.

In other words, $$h_i \in \{h_0 h_1 \ldots h_{N-1}\} h_{t,n} \in \{h_{t,0} h_{t,1} \ldots h_{t,N_d-1}\} \in \{h_0 h_1 \ldots h_{N-1}\} \quad (7)$$

In FIG. 7, the channel gain-based detection unit also includes: a false time-domain channel generation unit (141) that generates a false channel impulse response (153) corresponding to pulses within the time domain channel impulse response, but excluding the true channel impulse response (ht, n) (152) of the target-transmitting unit or any other transmitting unit, which is sharing the same transmission frequency band; and an evaluate false channel gain unit (142) that evaluate a channel gain or mean square value, for example, of the false time domain impulse response.

Mathematically, a false channel impulse response hf,n is expressed as $$h_{f,n} \notin \{h_{t,0} h_{t,1} \ldots h_{t,N_d-1}\}$$

and $$h_{f,n} \in \{h_0 h_1 \ldots h_{N-1}\} \quad (8)$$

Figure 9:
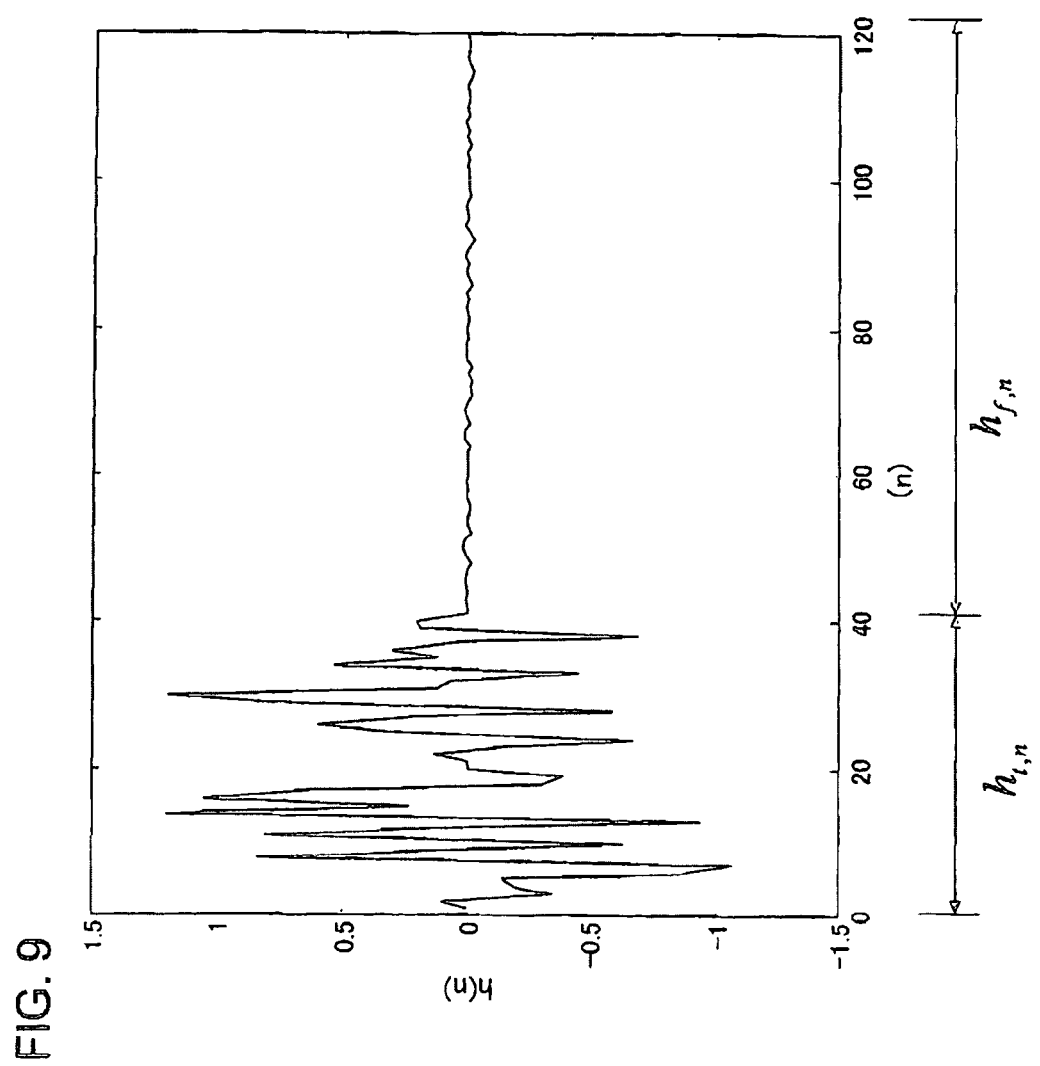
FIG. 9 shows a typical time domain impulse response of a wireless communications system.

FIG. 9 illustrates a practical time domain channel impulse response of a channel with a delay spread of 40 samples. In FIG. 9, the respective time intervals of a true channel impulse response ht,n corresponds to delay profile of a channel with a length corresponding to the delay spread and a false channel impulse response hf,n, are indicated.

In the present exemplary embodiment, as described with reference to step S13 and step S14 of FIG. 6, and the normalization unit (144) of FIG. 7, a reference parameter (151) is evaluated using the following equation:

$$R_{NCHCH} = \frac{P_{CH}}{P_{CH} - P_{NCH}} \quad (9)$$

where $$P_{CH} = \frac{1}{N_d} \sum_{n=0}^{N_d-1} |h_{t,n}|^2 \quad (10)$$

$$P_{NCH} = \frac{1}{N_f} \sum_{n=0}^{N_f-1} |\hat{h}_{f,n}|^2 \quad (11)$$

Note that it is possible to scale the reference parameter ($R_{NCHCH}$) (151) with some scaling factor.

<Correlation-based Detection Method>

Figure 10:
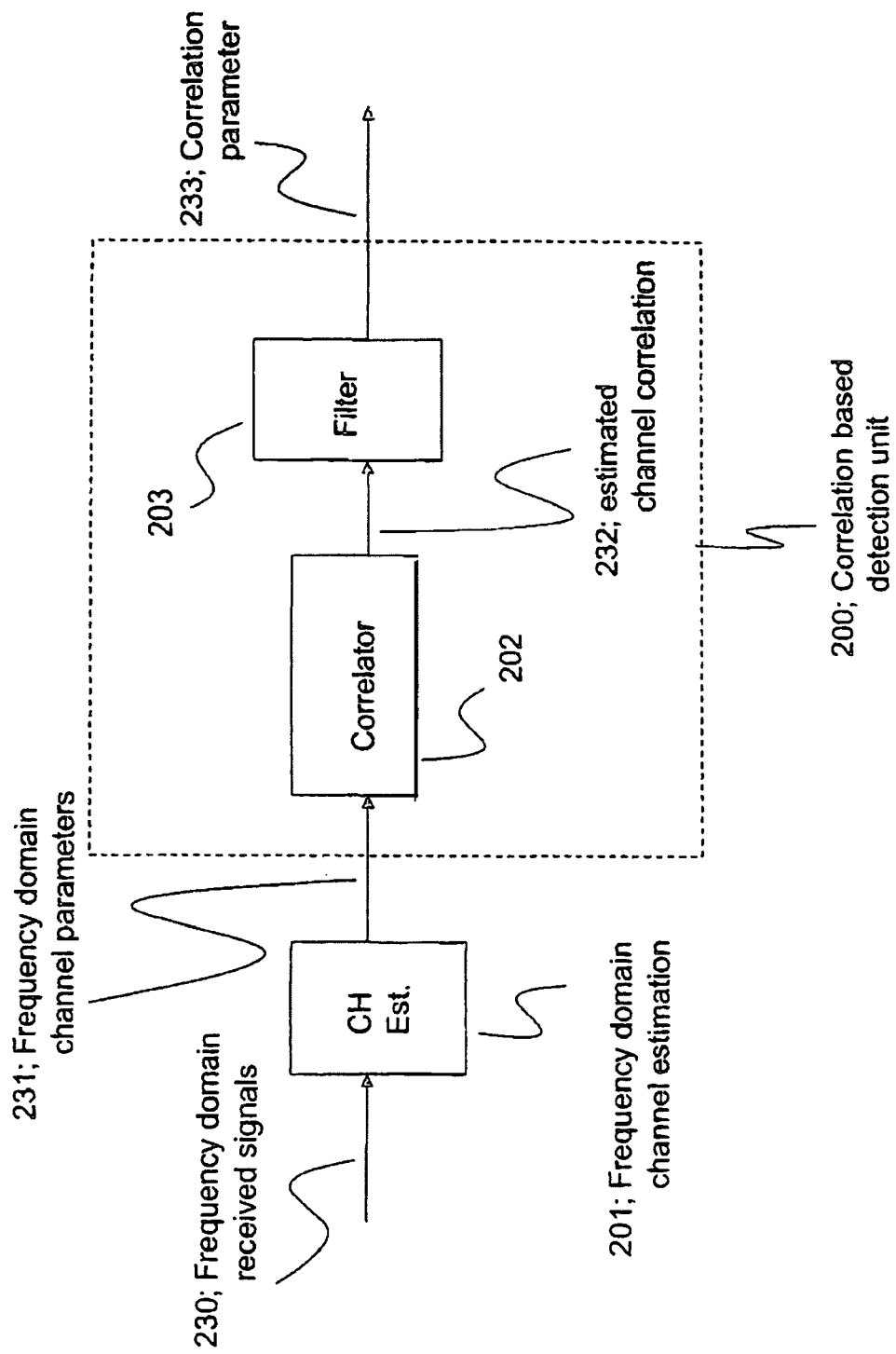
FIG. 10 is a diagram illustrating a method for measuring the correlation of the channel parameters.

In a variation of the present example, the detection unit (103) in FIG. 4 may well be configured as a correlation-based detection unit which uses either frequency-domain channel parameters (130) or time-domain channel parameters (131):

FIG. 10 illustrates the configuration of the detection unit (103) which is implemented using a correlation-based detection approach. The detection unit detects if a target signal is in the signal streams received in a sector. More specifically, referring to FIG. 10, the detection unit (correlation-based detection unit) designated by a reference numeral 200 includes:

a correlator (202) that receives frequency domain channel parameters (231) from a frequency domain channel estimation unit (201) that estimates frequency domain channel parameters from frequency domain receives signals (230), and measures degree of correlation of frequency-domain channel parameters (231); and a filter 203 that filters the estimated channel correlation (232) to generate a final correlation parameter (233). The final correlation parameter (233) is then processed in a comparison unit (104) in FIG. 4.

The correlation-based detection approach described with reference to FIG. 10 can also use time-domain channel parameters. In this case, the correlator (202) and the filter (203) evaluates correlation between the true time domain channel impulse response ht,n at two different time intervals or time-slots.

The correlation parameter can also be used to normalize channel gain parameter (Eq.10) as illustrated in the following equation.

$$R_{COR} = \frac{P_{CH}}{P_{COR}} \quad (12)$$

where Rcor is a correlation parameter that corresponds to the correlation between the true time domain channel impulse response at two different time intervals of time-slots, and PCH has been defined in Eq. (10).

The correlation parameter can also be estimated by measuring the correlation between the frequency-domain channel parameters at adjacent subcarriers. In a practical system, channel parameters in adjacent subcarriers are highly correlated.

Figure 11:
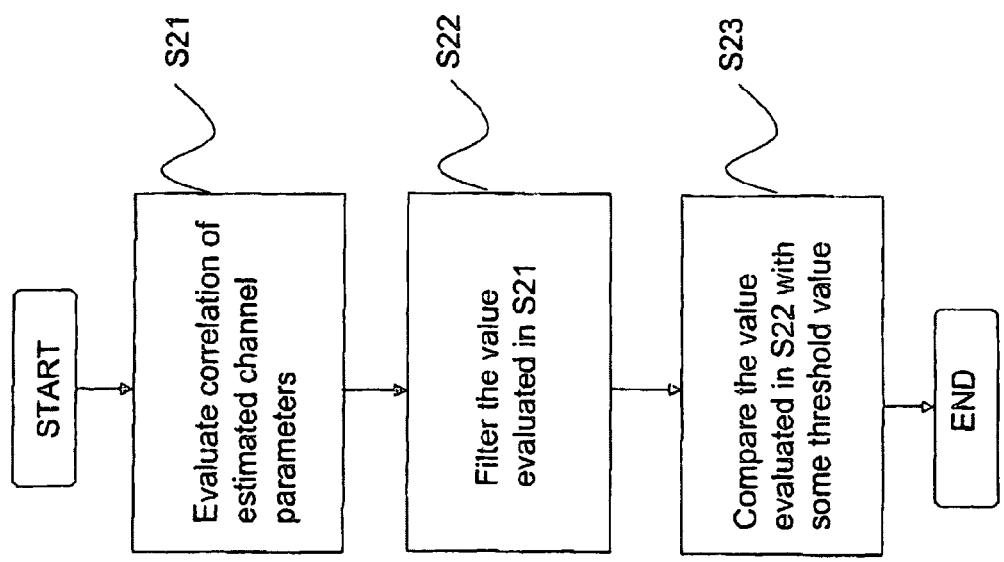
FIG. 11 is a flow chart illustrating a method for measuring the correlation of the channel parameters.

FIG. 11 illustrates a flow chart of the correlation based approach for detecting the presence of a target signal. Processing steps S21, S22 and S23 described in FIG. 11 are performed respectively by the correlator (202) and the filter (203) of FIG. 10 and the comparison unit 104 in FIG. 4. The combination of steps S21 and S22 can also be considered to correspond to the detection 104 in FIG. 4.

Referring to FIG. 11, in a first step S21, the correlation of the channel parameters of a sector is estimated.

In a second step S22, the estimated correlation parameter is filtered.

In a third step S23, the correlation parameter is compared with a threshold.

According to (3) and (4), the channel matrix that is forwarded to the interference cancellation unit has a matrix with increased size when signal from a transmitting unit is detected in more than one sector. This is equivalent to MEMO system with an increased number of possible paths of signal transmission. Increased number of paths minimizes interference hence reducing BER. Furthermore, when signal is detected in only one sector, the channel matrix is small and hence the overall computational complexity is reduced, while achieving the best possible BER performance.

The channel-gain based detection unit in FIG. 7 detects signal from a given transmitting unit by measuring power of the estimated channel. In absence of any transmitted signal, the power of the false impulse response is basically the same as power of the true impulse response.

Equation (9) provides an effective measure as to how close the power of the false impulse response is to the power of the true impulse response.

In the correlation-based detection unit (200) in FIG. 10, true channel impulse responses estimated at two different time slots are not correlated if signal from a transmitting unit cannot be detected in the signal received from a given sector. In such a situation, the correlation parameter will be much smaller. A measure of the size of the correlation parameter is provided in Equation (12).

Figure 12:
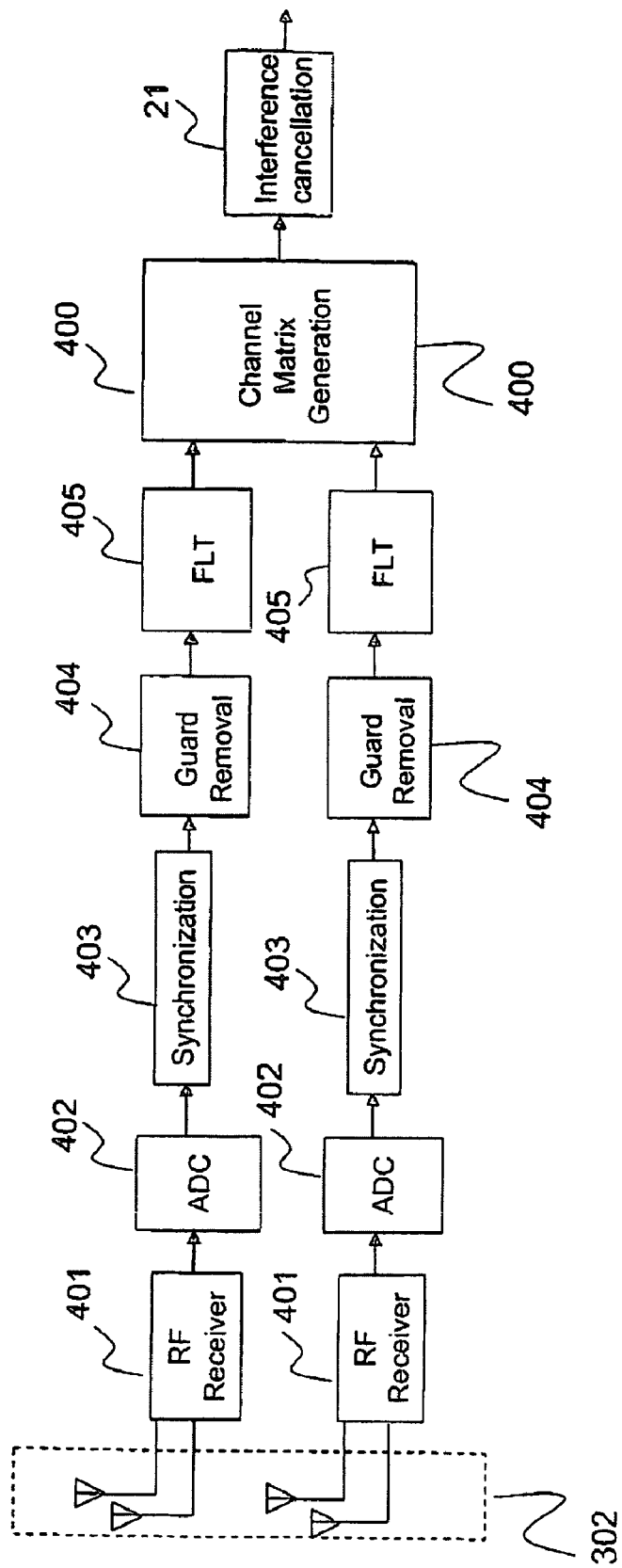
FIG. 12 is an example of the OFDM receiver with a channel-matrix generation unit based on the present invention.

One area of wireless communications systems in which the present invention can be applied is in a receiver (base station) that receives and decode signals from an OFDM-based transmitting unit. Such a system is illustrated in FIG. 12, where multiple signal streams are received using multiple antennas in a unit (302). For each received signal stream received at the unit (302), there is provided an RF receiver unit (401) that performs amplification, filtering and down-conversion, an analog-digital conversion (ADC) unit (402) that converts the analog signal to a digital signal, a synchronization unit (403) that performs time and frequency synchronization, a guard removal unit (404) that removes a cyclic prefix that had been appended at the transmitter, and a forward linear transformer (FLT) (405) that in most cases represents an FFT (Fast Fourier Transform) operation. The receiver also includes a channel-matrix generation unit (400) that includes channel estimation and dynamic channel-matrix generation unit according to the present invention, and an interference cancellation unit (21) that cancels the interference to generate an originally transmitted target signal.

Figure 13:
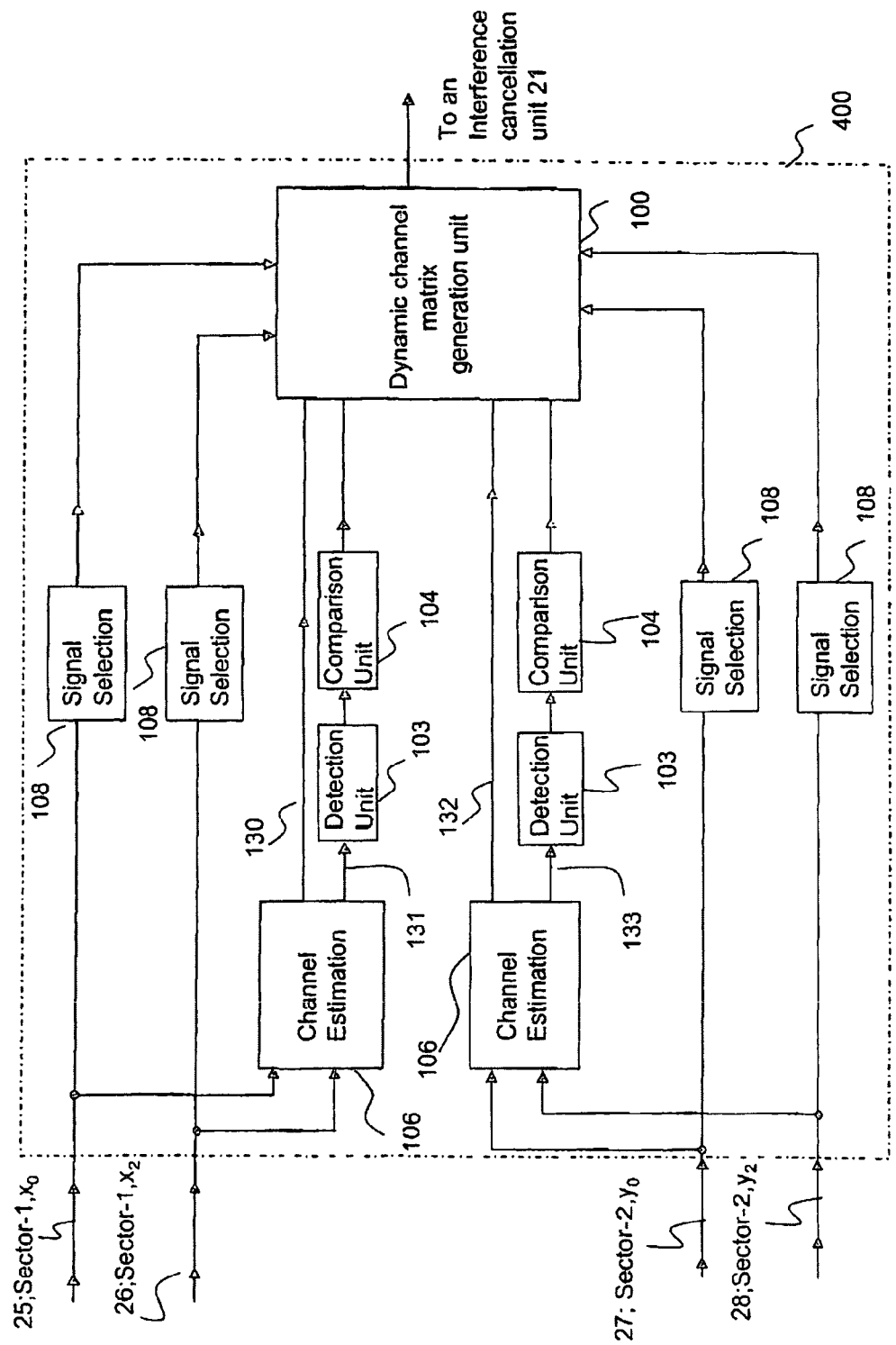
FIG. 13 is an example illustrating an application of present invention in channel matrix generation.

FIG. 13 is a diagram illustrating the configuration of the channel-matrix generation unit (400) in FIG. 12. Referring to FIG. 13, the output from the FLT unit (405) in FIG. 12 are indicated by two signal streams (25 and 26) from sector-1 and (27 and 28) from sector-2.

As in a general OFDM system, these signals represent frequency domain signals that are used to estimate channel parameters in a channel estimation unit (106). The channel parameters output from the channel estimation unit (106) includes the frequency-domain channel parameters (132), and the time domain channel parameters 133. The frequency-domain channel parameters (132) include channel parameters for each of the OFDM subcarriers. The time domain channel parameters (133) include time domain true impulse response and the false impulse. The true time domain impulse response and the false time domain impulse response are then sent to the detection unit (103), which generates a detect-signal in accordance with a method described with reference to FIG. 6 and FIG. 7.

Output from the detection unit (103) is used by the comparison unit (104) to obtain a decision parameter that is then used by the dynamic channel-matrix generation unit (100). The dynamic channel-matrix generation unit (100) generates channel matrix and signal vector of a subcarrier that has been selected by the signal selection unit (108).

The channel matrix and signal vector generated by the dynamic channel-matrix generation unit (100) are then used by the interference cancellation unit (21).

Figure 14:
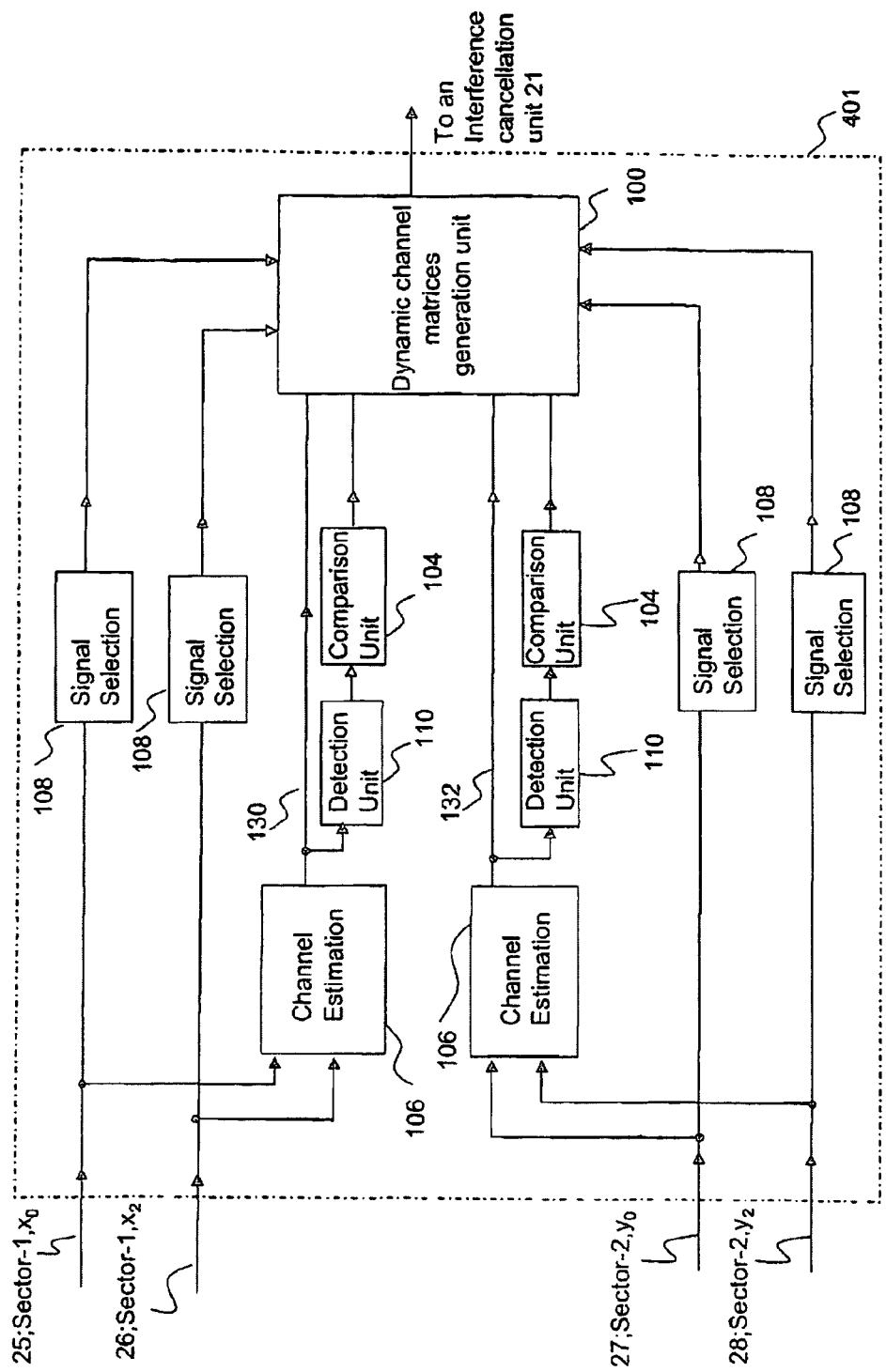
FIG. 14 is another example illustrating an application of present invention in channel matrix generation.

FIG. 14 is a diagram illustrating the configuration of another exemplary embodiment of the present invention. In the present exemplary embodiment, the detection unit (110) adopts the correlation detection method described with reference to FIG. 10 and FIG. 11. The present exemplary embodiment is also OFDM-based receiver shown in FIG. 12, where the channel-matrix generation unit (400) is replaced with a channel-matrix generation unit (401) as shown n FIG. 14.

Referring to FIG. 14, the output from the FLT unit (405) includes two signal streams (25 and 26) from sector-1 and (27 and 28) from sector-2. In the present example, the channel parameters include only frequency-domain channel parameters (132). The frequency-domain channel parameters (132) are then supplied to the detection unit (110), which generates a detect-signal using a method described with reference to FIG. 10 and FIG. 11. Note that it is also possible to use the time domain channel parameters (133) as with in FIG. 12. The output from the detection unit (110) is used by the comparison unit (104) to decision parameter that is then used by the dynamic channel-matrix generation unit (100). The dynamic channel-matrix generation unit (100) generates channel matrix and signal vector of a subcarrier that has been selected by the signal selection unit (108). Generated matrix and signal vector are then used by the interference cancellation unit (21).

The present exemplary embodiment enables an improvement in channel capacity by reducing the BER when a target signal is detected in more than one sector.

In addition, by dynamically changing the size of the channel matrix, overall computation complexity of the receiver is reduced since an increased size of channel matrix is used only when it is possible to increase the channel capacity.

The present invention can be applied to any multi-sectored base station. This includes the base stations for mobile communications.

The above description was made in connection with the examples described above. The present invention, however, is not limited to the configurations of the examples described above alone, and of course includes various variations and modifications that could be made by those skilled in the art within the scope of the present invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A signal processing method in a base station receiver that receives and processes single carrier or multiple carrier signals from a plurality of transmitting units in a sectored coverage area, signal power gain between transmit and receive antennas of one or more transmitting units and the receiver within each sector being represented as a channel matrix with path gains, the method comprising:
- determining if signal from a given target transmitting unit is available in the received signal of a sector;
- in case the signal from the target transmitting unit is detected in at least two sectors,
- combining a plurality of the channel matrices associated with respective ones of the at least two sectors to generate a channel matrix which is larger in size than each of the channel matrices associated with the respective sectors, and concatenating a plurality of received signal vectors associated with the respective sectors to generate a received signal vector which is larger in size than each of the received signal vectors associated with the respective sectors; and
- canceling interference from one or more other transmitting units sharing a given channel with the target transmitting unit, using the generated channel matrix and the generated received signal vector;
- while in case the signal from the target transmitting unit is detected in only one sector, canceling interference from the received signal from the transmitting unit, using the channel matrix and the received signal vector each associated with the one sector.

2. The method according to claim 1, wherein in determining if signals from the target transmitting unit is available in the received signal of a sector, the method comprises:
- evaluating the path gain at subcarriers using a pilot signal specific to the target transmitting unit;
- converting the estimated path gain of the subcarriers to a time domain impulse response (h0,h1, . . . , hN);
- separating the time domain impulse response into a first part: (h0,h1 . . . , hL) and a second part: (hL+1, . . . , hM), wherein the first part corresponds to delay profile of a channel with a length corresponding to the delay spread;
- evaluating mean square value of the first part (h0,h1 . . . , hL) to obtain a first parameter (PCH);
- evaluating mean square value of the second part (hL+1, . . . , hM) to obtain a second parameter (PNCH);
- subtracting the second parameter (PNCH) from the first parameter (PCH) to obtain a third parameter (DNCH);
- dividing the first parameter (PCH) with the third parameter (DNCH) to obtain a fourth parameter (RNCH); and
- comparing the fourth parameter (RNCH) with a predetermined threshold, wherein when the comparison result indicates that the fourth parameter is greater than the threshold, it is determined that signal from the transmitting unit is in the signal received from a given sector.

3. The method according to claim 2, further comprising:
- obtaining the second part (hL+1, . . . , hN) of the time domain impulse response by ignoring part of the impulse response that correspond to the channel delay profile, and impulse response that arise from interfering mobile terminal.

4. The method according to claim 1, wherein in determining if signals from a given target transmitting unit is available in the received signal of a sector, the method comprises:
- evaluating the path gain at the subcarriers of at least two different time slots, using a pilot signal that is specific to the given transmitting unit;
- converting the estimated path gain of the subcarriers for each of the time slots to obtain an equivalent time domain channel impulse response;
- for at least two of time slots, separating each of the time domain impulse responses into a first part: (h0,h1 . . . , hL) and second part: (hL+1, . . . , hN), wherein the first part (h0,h1 . . . , hL) has a length that corresponds to the delay spread of transmission channel;
- evaluating a correlation parameter that has a correlation factor of at least the first part (h0,h1 . . . , hL) of the first time slot and the first part (g0,g1 . . . , gL) of any other time slot other than the first time slot; and
- modifying the correlation parameter by additional signal processing to obtain a reference for comparison with a predetermined threshold, wherein if the reference parameter is greater than the threshold, it is determined that signal from the transmitting unit is in the signal received from a given sector.

5. The method according to claim 4, wherein the correlation factor is an average of correlation between the first parts of the respective channel impulse responses at least two different time slots.

6. The method according to claim 4, comprising:
- modifying the correlation parameter by:
- evaluating power of the first part (h0,h1 . . . , hL) of the channel impulse response at one or more time slots to obtain a normalization parameter; and
- dividing normalization parameter with the correlation parameter to obtain a modified correlation parameter.

7. The method according to claim 1, wherein in determining if signals from a given target transmitting unit is available in the received signal of a sector, the method comprises:
- evaluating the path gain at the subcarriers of at least one or more time slots using a pilot signal that is specific to a given transmitting unit;
- evaluating a parameter that is a measure of how the path gains at different subcarriers within the same time slot, are correlated to one another; and
- modifying the parameter by additional signal processing that includes either averaging or filtering to obtain a correlation parameter of the target transmitting unit and a given sector.

8. The method according to claim 1, comprising:
- performing interference cancellation, using at least one of mean square error approach, zero forcing approach and maximum likelihood detection approach.

9. A signal processing system in a base station receiver that receives and processes single carrier or multiple carrier signals from a plurality of transmitting units in a sectored coverage area, signal power gain between transmit and receive antennas of one or more transmitting units and the receiver within each sector being represented as a channel matrix with path gains, the system comprising:
- a detection unit that determines if signal from a given target transmitting unit is available in the received signal of a sector;
- a channel matrix generation unit that combines a plurality of the channel matrices associated with respective sectors to generate a channel matrix which is larger in size than each of the channel matrices associated with respective sectors, and that concatenates a plurality of received signal vectors associated with respective sectors to generate a received signal vector which is larger in size than each of the received signal vectors associated with respective sectors; and
- an interference cancellation unit that, in case the signal from the target transmitting unit is detected in at least two sectors, cancels interference from one or more other transmitting units sharing a given channel with the target transmitting unit, using the channel matrix and the received signal vector each generated by the channel matrix generation unit, while, in case the signal from the target transmitting unit is detected in only one sector, the interference cancellation unit canceling interference from the received signal from the transmitting unit, using the channel matrix and the received signal vector each associated with the one sector.

10. The system according to claim 9, wherein the detection unit comprises:
a channel estimation unit that evaluates frequency-domain path gain at subcarriers using pilot signal that is specific to a given transmitting unit;
a time domain conversion unit that converts the estimated frequency domain path gain of the subcarriers to a time domain impulse response (h0,h1, . . . , hN);
a separation unit that separates the time domain impulse response into a first part: (h0,h1 . . . , hL) and a second part: (hL+1, . . . , hM), wherein the first part (h0,h1 . . . , hL) corresponds to delay spread of a channel;
a first mean gain evaluating unit that evaluates mean square value of the first part (h0,h1 . . . , hL) to obtain a first parameter (PCH);
a second mean gain evaluating unit that evaluates mean square value of the second part (hL+1, . . . , hN) to obtain a second parameter (PNCH);
a subtraction unit that subtracts the second parameter (PNCH) from the first parameter (PCH) to obtain a third parameter (DNCH);
a division unit that divides the first parameter (PCH) with the third parameter (DNCH) to obtain a fourth parameter (RNCH); and
a comparison unit that compares the fourth parameter (RNCH) with a predetermined threshold, wherein if the comparison result indicates that the fourth parameter is greater than the threshold, it is determined that signal from the transmitting unit is in the signal received from a given sector.

11. The system according to claim 10, wherein the separation unit generates the second part of the time domain impulse response that is obtained by ignoring part of the impulse response that correspond to the channel delay profile, and impulse response that arise from any interfering transmitting unit.

12. The system according to claim 9, wherein the detection unit comprises:
a channel estimation unit that evaluates the frequency-domain path gain at subcarriers of at least two different time slots using a pilot signal that is specific to a given transmitting unit;
a time domain conversion unit that converts the estimated frequency-domain path gain of the subcarriers for each of the time slots to obtain an equivalent time domain channel impulse response;
a separation unit that separates the time domain impulse response into a fast part: (h0,h1 . . . , hL) and a second part: (hL+1, . . . , hM), wherein the first part (h0,h1 . . . , hL) corresponds to delay spread of a channel;
a correlation unit that evaluates a correlation between at least the first part (h0,h1 . . . , hL) of the first time slot and the first part (g0,g1 . . . , gL) of any other time slot other than the first time slot; and
a correlation manipulation unit that modifies the correlation parameter evaluated by the correlation unit, by additional signal processing to obtain a reference for comparison with a predetermined threshold in the comparison unit.

13. The system according to claim 12, wherein the correlation unit evaluates correlation by averaging of correlation between the first parts of the channel impulse responses of a combination of two time slots.

14. The system according to claim 9, wherein in determining if signals from a given target transmitting unit is in the received signal of a sector, the detection unit evaluates the path gain at the subcarriers of at one or more time slots using a pilot signal that is specific to a given transmitting unit,
evaluates a parameter that is a measure of how path gains at different subcarriers and same time slot, are correlated to one another, and
modifies the parameter by additional signal processing that includes either averaging or filtering to obtain a correlation parameter of a given transmitting unit and a given sector.

15. The system according to claim 14, wherein the detection unit modifies the correlation parameter by:
evaluating cross correlation of the first part (h0,h1 . . . , hL) of the channel impulse response at least one of time slot to obtain a normalization parameter; and
dividing normalization parameter with the correlation parameter to obtain a modified correlation parameter.

16. The system according to claim 9, wherein the interference cancellation unit performs interference cancellation, using at least one of mean square error approach, zero forcing approach and maximum likelihood detection approach.

17. A base station that receives and processes single carrier or multiple carrier signals from a plurality of transmitting units in a sectored coverage area, signal power gain between transmit and receive antennas of one or more transmitting units and the receiver within each sector being represented as a channel matrix with path gains, the base station comprising:
a detection unit that determines if signal from a given target transmitting unit is available in the received signal of a sector;
a channel matrix generation unit that combines a plurality of the channel matrices associated with respective sectors to generate a channel matrix which is larger in size than each of the channel matrices associated with respective sectors, and that concatenates a plurality of received signal vectors associated with respective sectors to generate a received signal vector which is larger in size than each of the received signal vectors associated with respective sectors; and
an interference cancellation unit that, in case the signal from the target transmitting unit is detected in at least two sectors, cancels interference from one or more other transmitting units sharing a given channel with the target transmitting unit, using the channel matrix and the received signal vector each generated by the channel matrix generation unit,
while, in case the signal from the target transmitting unit is detected in only one sector,
the interference cancellation unit canceling interference from the received signal from the transmitting unit, using the channel matrix and the received signal vector each associated with the one sector,
wherein the detection unit comprises:
a channel estimation unit that evaluates frequency-domain path gain at subcarriers using pilot signal that is specific to a given transmitting unit;
a time domain conversion unit that converts the estimated frequency domain path gain of the subcarriers to a time domain impulse response (h0,h1, . . . , hN);
a separation unit that separates the time domain impulse response into a first part: (h0,h1 . . . , hL) and a second part: (hL+1, . . . , hM), wherein the first part (h0,h1 . . . , hL) corresponds to delay spread of a channel;

a first mean gain evaluating unit that evaluates mean square value of the first part (h0,h1 ..., hL) to obtain a first parameter (PCH);

a second mean gain evaluating unit that evaluates mean square value of the second part (hL+1, ..., hN) to obtain a second parameter (PNCH);

a subtraction unit that subtracts the second parameter (PNCH) from the first parameter (PCH) to obtain a third parameter (DNCH);

a division unit that divides the first parameter (PCH) with the third parameter (DNCH) to obtain a fourth parameter (RNCH); and a comparison unit that compares the fourth parameter (RNCH) with a predetermined threshold, wherein if the comparison result indicates that the fourth parameter is greater than the threshold, it is determined that signal from the transmitting unit is in the signal received from a given sector.

18. A base station that receives and processes single carrier or multiple carrier signals from a plurality of transmitting units in a sectored coverage area, signal power gain between transmit and receive antennas of one or more transmitting units and the receiver within each sector being represented as a channel matrix with path gains, the base station comprising:

a detection unit that determines if signal from a given target transmitting unit is available in the received signal of a sector;

a channel matrix generation unit that combines a plurality of the channel matrices associated with respective sectors to generate a channel matrix which is larger in size than each of the channel matrices associated with respective sectors, and that concatenates a plurality of received signal vectors associated with respective sectors to generate a received signal vector which is larger in size than each of the received signal vectors associated with respective sectors; and an interference cancellation unit that, in case the signal from the target transmitting unit is detected in at least two sectors, cancels interference from one or more other transmitting units sharing a given channel with the target transmitting unit, using the channel matrix and the received signal vector each generated by the channel matrix generation unit, while, in case the signal from the target transmitting unit is detected in only one sector, the interference cancellation unit canceling interference from the received signal from the transmitting unit, using the channel matrix and the received signal vector each associated with the one sector, wherein the detection unit comprises:

a channel estimation unit that evaluates the frequency-domain path gain at subcarriers of at least two different time slots using a pilot signal that is specific to a given transmitting unit;

a time domain conversion unit that converts the estimated frequency-domain path gain of the subcarriers for each of the time slots to obtain an equivalent time domain channel impulse response;

a separation unit that separates the time domain impulse response into a fast part: (h0,h1 ..., hL) and a second part: (hL+1, ..., hM), wherein the first part (h0,h1 ..., hL) corresponds to delay spread of a channel;

a correlation unit that evaluates a correlation between at least the first part (h0,h1 ..., hL) of the first time slot and the first part (g0,g1 ..., gL) of any other time slot other than the first time slot; and a correlation manipulation unit that modifies the correlation parameter evaluated by the correlation unit, by additional signal processing to obtain a reference for comparison with a predetermined threshold in the comparison unit.

* * * * *